United States Patent [19]
Resk

[11] 3,970,274
[45] July 20, 1976

[54] TILT MOUNTING

[76] Inventor: E. Edward Resk, 645 Pine Brook Blvd., New Rochelle, N.Y. 10804

[22] Filed: Oct. 30, 1974

[21] Appl. No.: 519,170

[52] U.S. Cl. ............................. 248/185; 248/371
[51] Int. Cl.² ......................................... F16M 11/10
[58] Field of Search ........... 248/457, 371, 372, 377, 248/393–396, 398, 176, 177, 178, 183–186, 188.2, 188.3, 278–281, 284, 286, 291, 292, 299; 108/6, 8

[56] References Cited
UNITED STATES PATENTS

| | | | |
|---|---|---|---|
| 1,158,078 | 10/1915 | Sauer | 248/278 X |
| 1,770,955 | 7/1930 | Storm | 108/8 |
| 2,704,235 | 3/1955 | Bion | 108/6 |
| 3,342,526 | 9/1967 | Serada | 297/258 |
| 3,545,710 | 12/1970 | Mooney | 248/183 |
| 3,873,054 | 3/1975 | McKee et al. | 248/371 |

FOREIGN PATENTS OR APPLICATIONS

| | | | |
|---|---|---|---|
| 1,535,292 | 6/1968 | France | 248/398 |
| 1,123,300 | 9/1956 | France | 248/183 |
| 807,555 | 1/1959 | United Kingdom | 248/183 |

*Primary Examiner*—Lawrence J. Staab
*Attorney, Agent, or Firm*—Alan H. Levine

[57] ABSTRACT

A tilt mounting for supporting equipment such as photographic or television cameras, radar antennas, laser beam devices, spot lights, or the like equipment which must be supported in a position to permit selective tilting in a vertical plane. The mounting comprises a tilt table to which the equipment may be secured, with the table having downwardly extending legs, straddled by the upwardly extending arms of a base frame. A pivot-slide connection is formed between the base frame arms and the tilt table legs, permitting the tilt table to be pivoted and slid upwardly with respect to the base frame. A cam and cam follower between the base frame arms and tilt table legs act to urge the tilt table and any equipment supported thereon upwardly as the equipment is tilted, to maintain the center of gravity of any equipment on the tilt table in a relatively horizontal plane. Locking means are provided to selectively fix the tilt table in a selected position.

9 Claims, 5 Drawing Figures

TILT MOUNTING

BACKGROUND OF THE INVENTION

This invention relates to the art of tilt mountings for supporting equipment such as cameras, antennas, laser beam generators, spot lights, or the like equipment, which must be selectively tilted during operation, and more particularly to a tilt mounting which permits the supported equipment to be tilted while maintaining its center of gravity in a substantially horizontal plane.

A variety of equipment supporting mounts have been evolved over the years, serving to support the equipment in a pre-selected position. Such mountings provide for "panning", that is rotation of the equipment in a horizontal plane; or "tilting" permitting the equipment to be swung in a vertical plane. Such mounts are clamped on vertical posts supported on tripods, dollies, or the like, and loosening of the clamp permits ready panning. The panning movement presents few problems of balance, since the center of gravity of the equipment remains relatively fixed with respect to the pivot axis.

However, tilting presents a problem, in that the weight of the camera, where it is offset with respect to the axis of tilting, as is usually the case, creates a turning moment, making it difficult to achieve the desired smooth and easy tilting action.

It has been found that maintaining the center of gravity of the equipment at a relatively constant height as the equipment is tilted, serves to substantially minimize imbalance, and ease of tilting is substantially facilitated.

To this end, attempts have been made in the past to provide tilt mountings which serve to maintain the center of gravity of the supported equipment at a substantially constant height. In British Patent 807,555 of Jan. 14, 1959, a tilt mounting is disclosed in which vertical guide bars are pivotally connected to the tiltable support member at its tilt axis, and cam plates are secured to the tiltable support member, so that upon tilting of the support member, the cam plates will act to raise the tiltable support member and its guide bars, thus simultaneously tilting the equipment and raising its center of gravity. The equipment disclosed by this British patent is relatively complex, requiring very precise positioning of the guide bars and continuous lubrication and maintenance of the guide bar bearings.

Mooney in U.S. Pat. No. 3,545,710, has attempted to eliminate some of the problems of British Patent 807,555, by eliminating the guide bars and bearings of the British patent. Mooney, however, has provided a mechanism in which a link is provided having ears pivotally connected to the base support, and another portion of the link pivotally connected to the tilt table. A relatively complex cam surface is formed at the pivot connection between the tilt table and the link, so that upon tilting of the tilt table, the cam surface will urge the table and its equipment to be raised to effect a raising of the center of gravity of the tilting equipment. The relatively complex cam surface and link structure result in a relatively expensive structure with the cam subject to jamming in its movement along the cam surface.

BRIEF SUMMARY OF THE INVENTION

It is with the above considerations in mind that the present tilt mounting has been evolved providing a relatively simple, easily maintainable tilt mounting for supporting equipment for selective tilting with the mounting maintaining the center of gravity of the equipment at a substantially constant height as the equipment is tilted.

It is accordingly among the primary objects of this invention, to provide an improved tilt mounting, serving to permit smooth tilting of any equipment supported by the mounting, with the tilting action not lowering the center of gravity of the equipment.

Another object of the invention is to provide a tilt mounting for maintaining the level of the center of gravity of the supported equipment during tilting, which is simpler in construction and less expensive to manufacture than previously available tilt mountings.

A further object of the invention is to provide a tilt mounting maintaining the level of the center of gravity of any equipment supported by the mounting during tilting, in which the mounting has relatively few moving parts and requires minimal maintenance.

An additional object of the invention is to provide a tilt mounting in which the relatively moving parts are not subject to jamming.

These and other objects of the invention which will become hereafter apparent, are achieved by forming a tilt mounting with a base frame having two spaced upwardly extending arms rigidly secured thereto. The base frame is formed with a standard clamp facilitating securement of the base frame to a support mast on a tripod or dolly. A tilt table having two spaced downwardly extending legs rigidly secured thereto is arranged with one leg of the table adjacent one of the arms of the base frame, and the other leg of the table arranged adjacent the other of the base frame arms. Between adjacent table legs and base frame arms, a pivot-slide connection is formed, so that upon tilting of the tilt table, the tilt table may both pivot and slide with respect to the base frame. A cam and cam follower are arranged between the base frame arms and tilt table legs, so that during tilting, a camming action will be produced serving to raise the center of gravity of any equipment supported on the tilt table. The pivot-slide connection between the base frame and tilt table is provided with a screw actuated washer clutch, permitting selective fixing of the tilt table at any desired position of tilt.

A feature of the invention resides in the utilization of a simple circular segment as a cam surface riding over a simple circular roller as a cam follower, to provide the desired camming action to maintain the level of the center of gravity of any equipment supported on the mounting.

Another feature of the invention resides in the pivot slide connection comprising a relatively simple slot with arcuate ends within which a simple roller bearing rides during tilting of the tilt table.

A further feature of the invention resides in the utilization of a simple washer clutch on a threaded stud extending through the pivot journal of the tilt table to provide for desired fixation of the table at a selected position of tilting.

BRIEF DESCRIPTION OF THE DRAWINGS

The specific details of a preferred embodiment of the invention and their mode of functioning, along with the best mode contemplated by the inventor for practicing the invention will be described in clear, concise and exact terms in conjunction with the accompanying drawings wherein.

DETAILED DESCRIPTION OF PREFERRED EMBODIMENT

Referring now more particularly to the drawings, like numerals in the various Figures will be employed to designate like parts.

Figure 3:
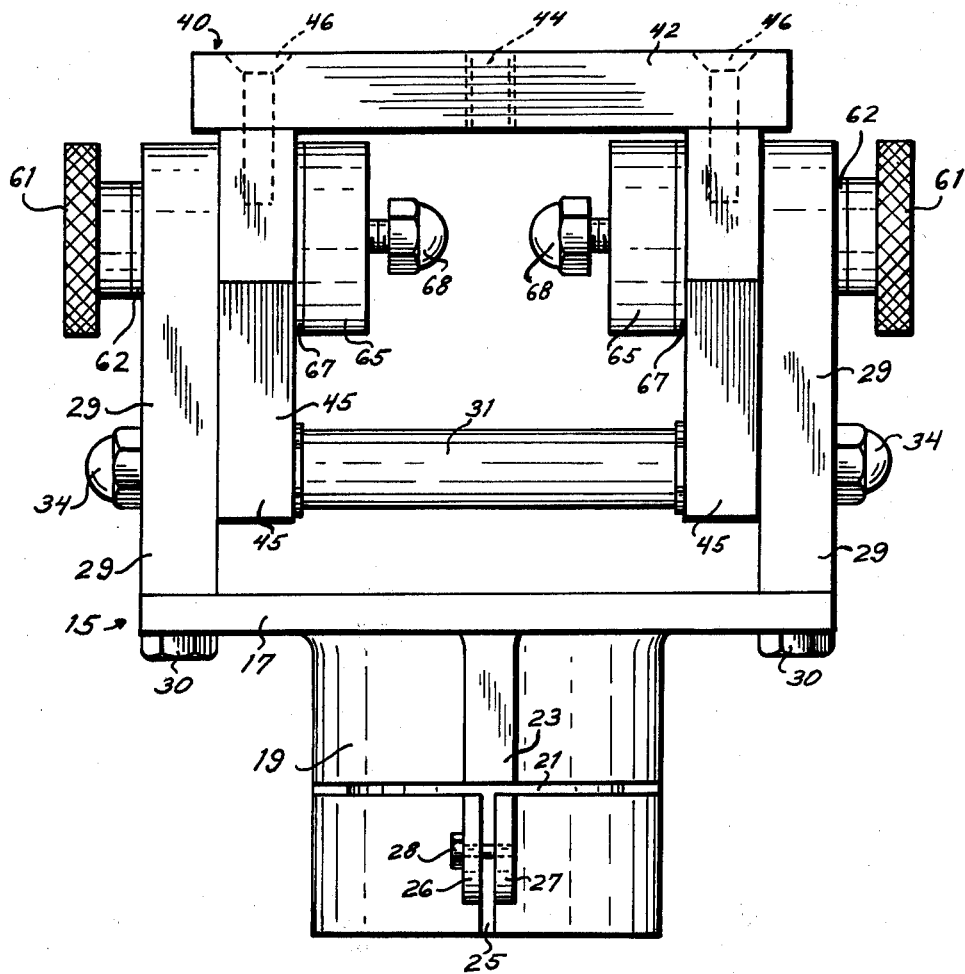
FIG. 3 is a side elevational view, on an enlarged scale, of the mounting shown in FIG. 1.

The tilt mounting 10 illustratively shown in the drawings embodying the concepts of the invention is formed with a base frame 15 having a base plate 17. In the illustrated embodiment of the invention, the securing collar 19 is formed integrally with frame base plate 17, preferably by casting the plate 17 and collar 19 as a unit. Securing collar 19 is formed with a horizontal slit 21 and a longitudinal flange 23 separated into two parts by vertical slit 25, as best seen in FIG. 3, to provide two separable collar flange ends 26 and 27. Vertical slit 25 extends not only between flange ends 26 and 27, but also through the end of collar 19 below slit 21. Machine screw 28 is extended through the flange ends 26 and 27 into threaded engagement with flange end 27, so that, as will be understood by those skilled in the art, upon tightening screw 28, the flange ends 26 and 27, along with the lower split collar ends, will be brought towards each other to tighten the slit collar about any mast upon which it is positioned.

Figure 1:
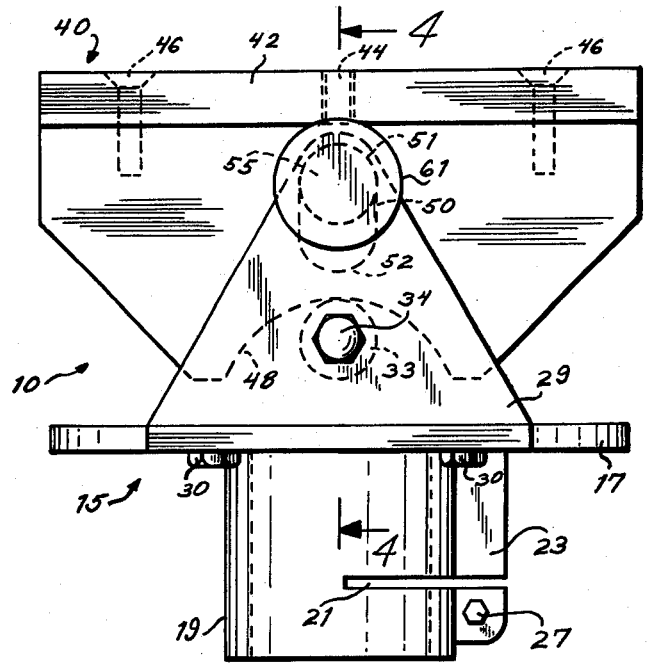
FIG. 1 is a side elevational view of a tilt mounting made in accordance with the teachings of this invention with the mounting components shown in an orientation supporting the equipment in a horizontal position.
Figure 4:
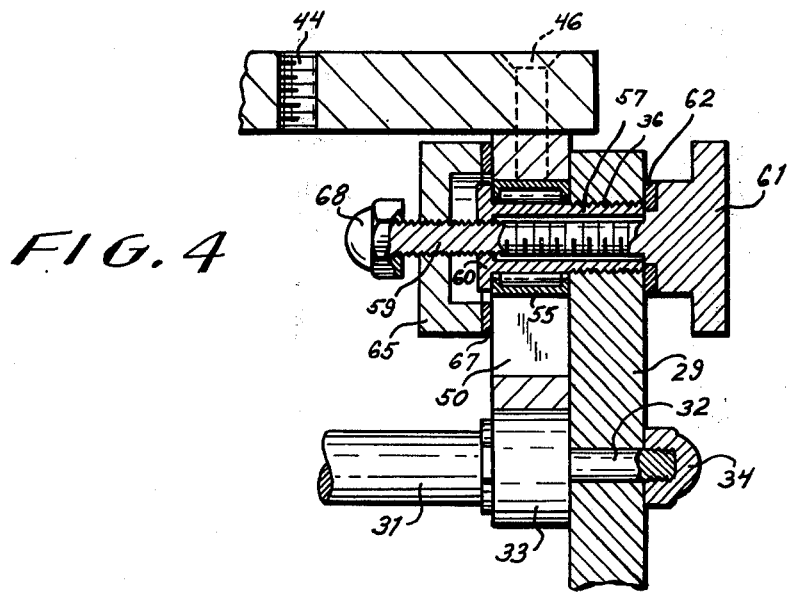
FIG. 4 is a cross-sectional detail view on lines 4 — 4 of FIG. 1 looking in the direction of the arrows, illustrating details of the locking means employed for fixing the tilt table in any desired position.
Figure 5:
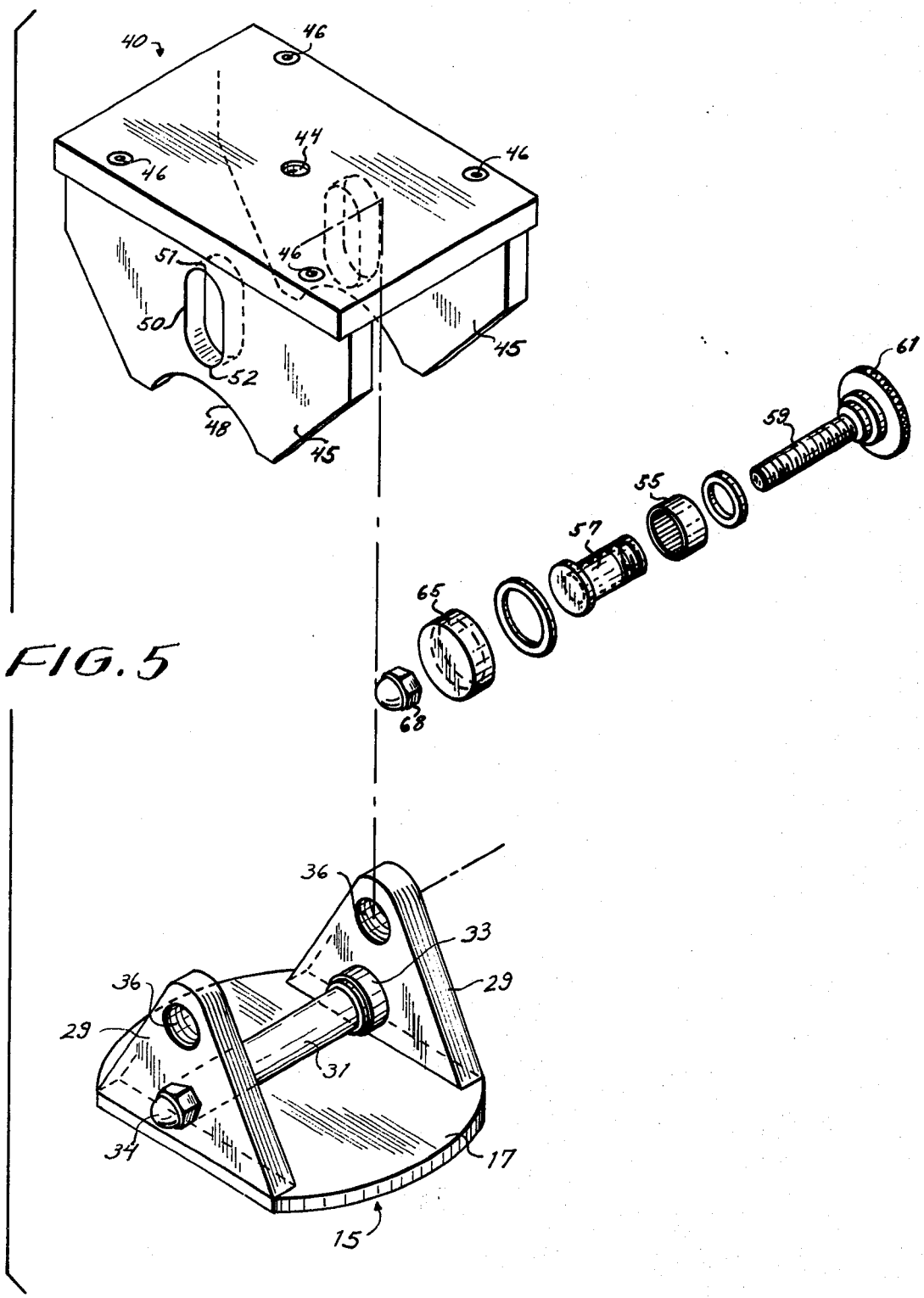
FIG. 5 is an exploded perspective view of the tilt mounting showing the tilt table separated from the base frame, and the components of the locking means separated from the pivot journal.

A pair of frame arms 29, in the form of an inverted "V", as best seen in FIGS. 1, 3 and 5, are secured on the frame base plate 17 by means of machine screws 30, extending through the base plate 17 into threaded engagement with the upstanding arms 29, to rigidly secure the arms 29 to the base plate. A cam follower shaft 31 having threaded ends 32 extending through arms 29, as best seen in FIG. 4, is arranged between the base frame arms 29, as best seen in FIG. 3, and cap nuts 34 secure the cam follower shaft 31 in position. Cam followers in the form of rollers 33 are rotatably supported in shaft 31, as best seen in FIG. 4.

A pivot journal opening 36 is formed at the upper end of arms 29, as viewed in FIG. 5.

Tilt table 40, as best seen in FIGS. 1, 3 and 5, is formed with a table plate 42, preferably provided with a threaded equipment attaching opening 44, facilitating attachment of the equipment to be supported such as a camera or the like to the table plate 42 by means of a threaded attaching bolt, or the like, extending from the equipment.

Figure 2:
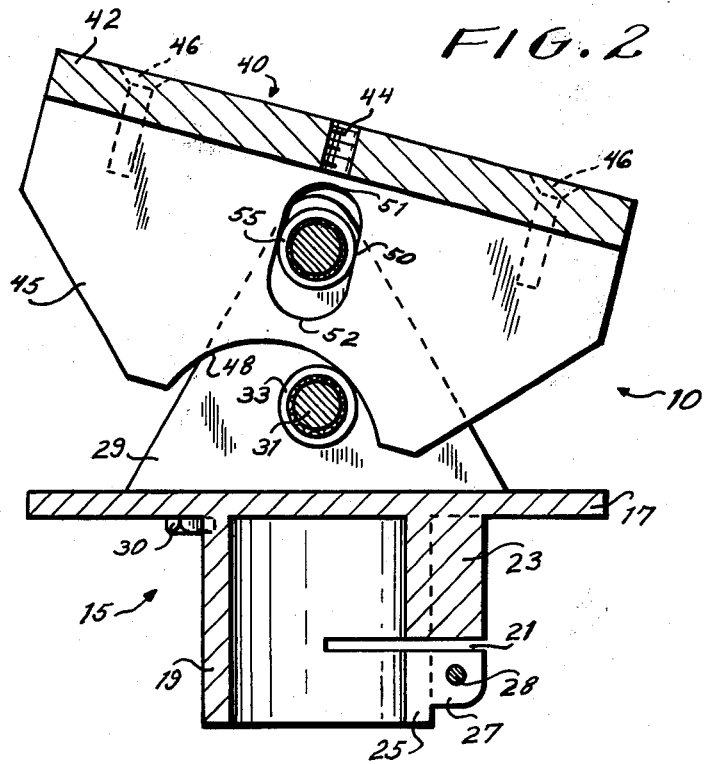
FIG. 2 is a cross-sectional elevational view of the tilt mounting shown in FIG. 1, illustrating the tilt table of the mounting in a tilted orientation showing how the tilt table is raised as it is tilted.

A pair of tilt table legs 45, as best seen in FIGS. 1, 3 and 5, are rigidly secured to the table top 42 by means of leg attaching machine screws 46. The lower ends of the legs 45 are contoured to provide a cam 48 having a cam surface which, as best seen in FIGS. 1 and 5, is formed with a circular segment, which it will be noted has a radius of curvature significantly larger than the radius of curvature of the roll forming cam follower 33. A slideway 50 having rounded ends 51 and 52 is provided in each of the legs 45, as best seen in FIGS. 1, 2 and 5. This slideway is dimensioned to bearingly accommodate a journal roller 55, as best seen in FIGS. 1, 2 and 4, the width of the slideway 50 and the radius of curvature of its curved ends 51 and 52 being such as to slidingly accommodate the journal roller 55, thus providing a pivot-slide connection between the base frame arms and tilt table legs.

The journal roller 55 is mounted for rotation on a journal shaft 57 which is threaded into engagement in the journal opening 36 of arms 29 of the base frame 15, as best seen in FIG. 4.

A threaded stud 59 having a knurled manually manipulable knob 61 secured on one end thereto is extended with a freely rotatable fit through journal bushing 57, and a clutch washer 62 formed of a suitable friction material is arranged between the knob 61 and the arm 29, as best seen in FIG. 4. The end of threaded shaft 59 remote from knob 61 is threaded through the bushing flange 60 and brake plate 65, as best seen in FIGS. 4 and 5, and a second clutch washer 67 is arranged between the brake plate 65 and the arm 29, as best seen in FIG. 4, so that upon turning knob 61 to thread stud 59 into bushing flange 60 and brake plate 65, the clutch washers 62 and 67 will be forced into frictional contact with the arm 29 and leg 45 respectfully, to maintain them in desired relative position. A cap nut 68 is provided on the free end of stud 59 to maintain the components in desired assembled relationship.

OPERATION

In use, the aforedescribed tilt mounting components are assembled as illustrated in FIGS. 1, 3 and 4 by positioning the legs 45 of the tilt table 40 between the arms 29 of the base frame 15, with the cam 48 at the lower end of arms 45 resting on cam follower roll 33, and with journal roll 55 riding in a slideway 50. The assembly is held in desired assembled relationship by means of threaded stud 59 extending through the journal bushing 57 between table legs 45, and frame arms 29.

In use, as will be apparent to those skilled in the art, the tilt mounting is positioned on a suitable mast mounted on top of a tripod, dolly, or the like support, with the tilt mounting 10 secured to the mast by means of securing collar 19 which is fastened to the mast by tightening screw 27 to draw the lower split collar end tight about the mast.

The equipment to be tiltably supported may be secured to the table plate 42 in any desired fashion, but is illustratively shown as adapted for securement by means of a conventional attaching screw engaging in threaded attaching opening 44 in plate 42 and the equipment is now supported for either tilting or panning.

It will be apparent to those skilled in the art that panning, or rotation of the equipment in a horizontal plane, is readily achievable by loosening screw 27 on securing collar 19, thus permitting the mounting and the equipment secured thereto to be rotated on the mast axis. Tightening of the screw 27 fixes collar 29 of the mast in any position to which the mounting has been panned.

Tilting is accomplished by loosening knobs 61 to release any braking pressure, and moving the equipment and the table plate 42 to which it is attached to any desired angle of tilt, as illustratively shown in FIG. 2. It will be observed, as best seen in FIG. 2, that as the tilt table 40 is tilted, the cam 48 rides on cam follower 33, causing the table and any equipment supported thereon to both tilt and ride up with a resulting maintenance of the center of gravity of the equipment at a substantially constant level.

As described above and illustrated in the drawings, the base frame 15 has two arms 29 and the tilt table 40 has two legs 45. This is the preferred embodiment since it offers the most stability. However, the base frame could have only one leg and the tilt table only one arm, the leg and arm being arranged side-by-side along the centerline of the tilt mounting. Alternatively, the base frame could have one leg along the centerline of the tilt mounting straddled by two arms of the tilt table, or the tilt table could have one arm along the centerline of the tilt mounting straddled by two legs of the base frame. In each of these cases, the arms and legs would be interengaged as described above.

The above disclosure has been given by way of illustration and elucidation, and not by way of limitation, and it is desired to protect all embodiments of the herein disclosed inventive concept within the scope of the appended claims.

What is claimed is:

1. A tilt mounting for supporting equipment for selective tilting of the equipment, said mounting comprising:
    a base frame having at least one upstanding arm,
    a tilt table having at least one depending leg,
    a downwardly facing arcuate cam surface carried by said tilt table leg,
    a cam follower carried by said base frame arm and having a fixed axis with respect to said arm, said follower engaging said cam surface,
    a slideway in said tilt table leg, and
    a pivot journal, carried by said base frame arm, slidably arranged within said slot, said pivot journal being formed with a threaded stud extending therethrough, a manually rotatable knob secured to an outer end of said stud, a brake plate threaded on the free end of said stud, a clutch washer on said stud between said brake plate and the tilt table leg adjacent thereto, whereby upon turning said knob to thread said screw into said journal, said washer will frictionally engage said leg to prevent pivoting of said tilt table.

2. A tilt table mounting as in claim 1 including two spaced arms rigidly secured to said base frame and two spaced legs rigidly secured to said tilt table, each of said base frame arms being formed with a slideway, and each of said tilt table legs being formed with a pivot journal.

3. A tilt table mounting as in claim 1 in which said cam follower comprises a cam surface of a radius less than the radius of curvature of the circular segment forming said cam.

4. A tilt table mounting as in claim 1 in which said slideway has arcuate ends; and said pivot journal is of a circular cross-section having a radius of curvature slightly less than the radius of curvature of the arcuate ends of said slideway.

5. A tilt mounting as in claim 1 in which a clutch washer is arranged on said stud between said knob and the base frame arm adjacent thereto.

6. A tilt table mounting as in claim 1 in which a knob, stud, brake plate and clutch washers are arranged between each frame arm and table leg pair.

7. A tilt table mounting as in claim 1 in which said tilt table has a top provided with means for securing equipment thereto.

8. A tilt mounting as in claim 1 wherein said slideway is a slot and said pivot journal is a roller having a diameter about equal to the width of said slot.

9. A tilt mounting as in claim 1 wherein said tilt table has a table plate for supporting equipment, said table plate being larger than the straight line distance between the ends of said cam surface.

* * * * *